United States Patent Office 2,851,335
Patented Sept. 9, 1958

2,851,335

PROCESS OF PRODUCING READILY FILTERABLE CALCIUM SULFATE DURING MANUFACTURE OF PHOSPHORIC ACID BY THE WET PROCESS

Erich Heinerth, Dusseldorf, Germany, assignor to Henkel & Cie. G. m. b. H., Dusseldorf-Holthausen, Germany, a corporation of Germany No Drawing. Application September 22, 1953
Serial No. 381,729

Claims priority, application Germany September 25, 1952

6 Claims. (Cl. 23—122)

This invention relates to an improved process of producing readily filterable calcium sulfate during manufacture of phosphoric acid by the wet process.

The wet process of producing phosphoric acid consists in reacting calcium phosphates with sulfuric acid. Thereby crude phosphoric acid is obtained with calcium sulfate as a by-product, which usually is separated by filtration from crude phosphoric acid. The calcium sulfate is usually filtered from said crude phosphoric acid and the filtered calcium sulfate is washed, usually in continuous operation and only occasionally discontinuously, whereby the filter cake is treated, step by step or counter currently, with the wash liquors of preceding filtration steps or with water. It has been found that certain kinds of calcium phosphate can be worked up to phosphoric acid according to the above described process only with great difficulty because they yield calcium sulfate slurries which cannot be readily filtered. The filters rapidly become clogged and then do not allow liquid to pass through even when covered with only a relatively thin layer of calcium sulfate.

It is one object of this invention to improve filterability of the calcium sulfate slurry obtained in the production of phosphoric acid from calcium phosphates by the wet process.

Another object of the invention is to improve the production of phophoric acid by the wet process so that difficult filterable calcium sulfates may be more readily separated from the phosphoric acid.

Various other objects and advantages of this invention will become apparent as this description proceeds.

In principle, filterability of such calcium sulfate slurries produced during the production of phosphoric acid is improved according to my invention by adding to the calcium phosphate before reacting the calcium phosphate with sulfuric acid, salts of bivalent metals which are soluble under the reaction conditions.

Reaction of calcium phosphates with sulfuric acid to produce phosphoric acid is usually effected in continuous operation in a manner known per se. This invention is, however, not limited to such continuous operation but may also be used when working in batches. The ground crude calcium phosphate is usually stirred with dilute sulfuric acid as it is obtained from washing the calcium sulfate slurry of a preceding operation, and with the required amount of about 70–80% sulfuric acid added to the more dilute wash acid. It is advisable to carry out the reaction at elevated temperature, especially at a temperature above 50° C. The reaction temperature may even be increased to the boiling point of the respective charge, and it has been suggested to effect said reaction at even higher temperature. However, such higher temperatures require working in autoclaves.

The salts of bivalent metals which are added according to the present invention and which are soluble under the reaction conditions, are added before the reaction of sulfuric acid with the calcium phosphate. They may be added to the suspension of said calcium phosphate or to the sulfuric acid. Said salts may also be produced during the decomposition of the calcium phosphate by adding corresponding insoluble metal compounds, such as oxides or carbonates, to the calcium phosphate or to the sulfuric acid which, on reaction with sulfuric acid, form the required bivalent metal sulfates. Suitable bivalent metals, the salts of which may be used according to this invention are, for example, magnesium, zinc, iron, nickel, copper, and the like, of which magnesium is preferred. The amount of such metal salts added is comparatively small. Additions of 1% to 2% and as a maximum, 5%, calculated as metal oxide, with respect to the solubilizable phosphorus pentoxide content of the calcium phosphate to be decomposed, are usually sufficient. If required, these amounts may, of course, be increased.

In order to operate under most economical conditions, it is desirable to employ said salts of bivalent metals, for instance, in the form of waste products, wherever possible. For example, a number of mineral phosphates have such a high magnesium content that when they are added in suitable amounts to other calcium phosphates, which normally yield difficult filterable calcium sulfate slurries, they will introduce the required amount of magnesium into the reaction mixture. In the subsequent conversion of the phosphoric acid to alkali phosphates and especially to di- or trialkali phosphates, the added bivalent metals precipitate in the form of difficult soluble precipitates as soon as the monoalkali phosphate is transformed into the dialkali phosphate. Said precipitates after removal from the dialkali phosphate may be dissolved in sulfuric acid and can then be added, as source of the required bivalent metal, to fresh reaction batches.

When compounds of bivalent metals are added to the calcium phosphate, sulfuric acid reaction mixture, which yield difficult soluble sulfides, it is possible to precipitate said compounds from the phosphoric acid in the form of sulfides by the addition of alkali metal or alkaline earth metal sulfides after filtration of the phosphoric acid from the calcium sulfate. If necessary, the crude phosphoric acid may be adjusted to the required pH-value by partial neutralization with alkalies before precipitation of the bivalent metal sulfides therefrom. By this procedure it is possible to reduce the sulfate content of the phosphoric acid, at the same time, when using, for example, barium sulfide for this purpose.

The following examples serve to illustrate the present invention without, however, limiting the same thereto:

*Example 1*

20 kg. of magnesium sulfate (epsom salt $MgSO_4.7H_2O$) are added to a mixture of 4 cubic meters of a wash liquor from a preceding operation containing about 5% of phosphorus pentoxide and 0.950 metric ton of sulfuric acid of 60° Baumé. The mixture is introduced into a reaction vessel provided with a stirring device. 1 metric ton of finely ground Constantine phosphate yielding a difficult filterable calcium sulfate slurry and containing 28.9% of phosphorus pentoxide or 63.1% of tri-calcium phosphate, is added to said mixture of wash liquor and sulfuric acid as rapidly as foaming permits. The temperature increases thereby to about 70° C. After stirring the reaction mixture for two hours, it is filtered by means of a rotary drum or the like filter. The entire batch is filtered within a period of time corresponding to that ordinarily required for filtering calcium sulfate slurries obtained from crude phosphate yielding filterable calcium sulfate slurries. Without addition of said magnesium sulfate, filtration of the resulting calcium sulfate slurry would require two to three times as much time.

*Example 2*

The following laboratory test method was made to obtain numerical values which are independent from the dimensions of the filtration apparatus employed in each case.

600 g. of finely ground Constantine phosphate containing 28.9% of phosphorus pentoxide were added as rapidly as foaming permitted to a mixture of 1000 cc. of wash liquor of a preceding operation and of 300 cc. of sulfuric acid of 60° Baumé (78% sulfuric acid). The metal salt to be tested for its filterability improving property was added in varying amounts to each batch of mixture of wash liquor and sulfuric acid. In one test 11 g. of magnesium sulfate (epsom salt $MgSO_4.7H_2O$) was added thereto. The temperature of the reaction mixture increased and the mixture was stirred at 70–80° C. for one hour. The slurry was then transferred to a Buchner funnel of 25 cm. diameter provided with a layer of ordinary filter paper and was filtered by suction at a vacuum of 400 mm. The period of time elapsing until the first fissures and cracks appear in the filter cake was determined by means of a stop watch.

It was found by this laboratory test method that the time required for filtering the above given batch of 600 g. of Constantine phosphate with an addition of 11 g. of magnesium sulfate (epsom salt) amounts to 7 minutes while without said magnesium sulfate addition the filtration required 15 to 30 minutes.

*Example 3*

When using the above described filtration test, 11 g. of copper sulfate ($CuSO_4.5H_2O$) was added in place of magnesium sulfate. The filtration of the slurry required 6 to 7 minutes, whereas without the copper sulfate addition the filtration would have required 15 to 30 minutes. It was also found that the same amounts of crystalline sulfates of zinc, iron, and nickel improved the filtration time to about the same extent.

While I have set forth various examples and conditions in which the principles of my invention may be applied, it will be understood that these are for the purpose of illustration only and that various modifications and changes may be made therein, and other salts of bivalent metals which are soluble under the reaction conditions may be used within the spirit of my invention and the scope of the following claims.

I claim:
1. In a process of producing a readily filterable calcium sulfate during the manufacture of phosphoric acid by the wet process, the steps comprising adding to at least one of the reaction components, before reacting calcium phosphate with sulfuric acid, a sulfate of a bivalent metal of the group consisting of magnesium, zinc, iron, nickel and copper, said sulfate being soluble under the reaction conditions, the amount of said sulfate added being at least about 1% by weight, calculated as bivalent metal oxide, of the solubilizable phosphorus pentoxide present in said calcium phosphate, and reacting the calcium phosphate with sulfuric acid in the presence of the sulfate of said bivalent metal.

2. In a process of producing a readily filterable calcium sulfate during the manufacture of phosphoric acid by the wet process, the steps comprising adding to at least one of the reaction components, before reacting calcium phosphate with sulfuric acid, a sulfate of a bivalent metal of the group consisting of magnesium, zinc, iron, nickel and copper, said sulfate being soluble under the reaction conditions, the amount of said sulfate added corresponding to between about 1% and about 2% by weight, calculated as bivalent metal oxide, of the solubilizable phosphorus pentoxide present in said calcium phosphate, and reacting the calcium phosphate with sulfuric acid in the presence of the sulfate of said bivalent metal.

3. In a process of producing a readily filterable calcium sulfate during the manufacture of phosphoric acid by the wet process, the steps comprising adding to at least one of the reaction components, before reacting calcium phosphate with sulfuric acid, at least 1% by weight of magnesium sulfate, calculated as magnesium oxide, based upon the amount of solubilizable phosphorus pentoxide present in said calcium phosphate, and reacting the calcium phosphate with sulfuric acid in the presence of said magnesium sulfate.

4. In a process of producing a readily filterable calcium sulfate during the manufacture of phosphoric acid by the wet process, the steps comprising adding to at least one of the reaction components, before reacting calcium phosphate with sulfuric acid, a salt of a bivalent metal of the group consisting of magnesium, zinc, iron, nickel and copper, said salt being soluble under the reaction conditions, the amount of bivalent metal salt added being at least about 1% by weight, calculated as bivalent metal oxide, of the solubilizable phosphorus pentoxide present in said calcium phosphate, and reacting the calcium phosphate with sulfuric acid in the presence of said salt of a bivalent metal.

5. In a process of producing a readily filterable calcium sulfate during the manufacture of phosphoric acid by the wet process, the steps comprising adding to at least one of the reaction components, before reacting calcium phosphate with sulfuric acid, a waste product containing a compound of a bivalent metal of the group consisting of magnesium, zinc, iron, nickel and copper, said compound being soluble under the reaction conditions, the amount of waste product added being such that the bivalent metal compound introduced thereby is at least 1% by weight, calculated as bivalent metal oxide, of the solubilizable phosphorus pentoxide present in said calcium phosphate, and reacting said calcium phosphate with sulfuric acid in the presence of said bivalent metal compound.

6. In a process of producing a readily filterable calcium sulfate during the manufacture of phosphoric acid by reacting calcium phosphate with sulfuric acid in a wet process, the steps comprising adding a material forming magnesium sulfate during the reaction to at least one of the reaction components before reacting the calcium phosphate with sulfuric acid, the amount of said added material forming magnesium sulfate being such that the magnesium content of the reaction mixture is between about 1% and about 2% by weight, calculated as magnesium oxide, of the solubilizable phosphorus pentoxide present in said calcium phosphate used as starting material, said added material being in the form of a calcium phosphate of high magnesium content, and then reacting the calcium phosphate with sulfuric acid to produce phosphoric acid.

References Cited in the file of this patent

UNITED STATES PATENTS

| Re. 20,994 | Larsson | Jan. 31, 1939 |
| --- | --- | --- |
| 302,266 | Biebig et al. | July 22, 1884 |
| 879,603 | Wallterstein | Feb. 18, 1908 |
| 1,790,220 | Balz et al. | Jan. 27, 1931 |
| 1,889,929 | Moore | Dec. 6, 1932 |
| 2,018,955 | Heckert | Oct. 29, 1935 |
| 2,049,032 | Weber et al. | July 28, 1936 |
| 2,081,351 | Booth et al. | May 25, 1937 |
| 2,106,223 | Nordengren | Jan. 25, 1938 |
| 2,739,038 | Heinerth | Mar. 20, 1956 |

FOREIGN PATENTS

| 8,975/32 | Australia | July 13, 1933 |
| --- | --- | --- |